United States Patent
Griffin et al.

(10) Patent No.: US 11,296,865 B1
(45) Date of Patent: *Apr. 5, 2022

(54) CRYPTOGRAPHIC ALGORITHM STATUS TRANSITION

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 412 days.

This patent is subject to a terminal disclaimer.

(21) Appl. No.: 16/543,053

(22) Filed: Aug. 16, 2019

Related U.S. Application Data

(63) Continuation of application No. 15/417,072, filed on Jan. 26, 2017, now Pat. No. 10,476,665.

(Continued)

(51) Int. Cl.
*H04L 9/06* (2006.01)
*H04L 9/32* (2006.01)
(Continued)

(52) U.S. Cl.
CPC .......... *H04L 9/0637* (2013.01); *H04L 9/006* (2013.01); *H04L 9/0643* (2013.01); *H04L 9/14* (2013.01);
(Continued)

(58) Field of Classification Search
CPC ... H04L 9/0637; H04L 9/3239; H04L 9/3249; H04L 9/006; H04L 9/14; H04L 9/302;
(Continued)

(56) References Cited

U.S. PATENT DOCUMENTS

| | | | |
|---|---|---|---|
| 9,443,108 B1 * | 9/2016 | Roth | H04L 9/3239 |
| 2002/0191790 A1 * | 12/2002 | Anand | H04L 9/0643 |
| | | | 380/255 |

(Continued)

OTHER PUBLICATIONS

Berners-Lee, et al., Uniform Resource Identifiers (URI): Generic Syntax, Xerox Corporation, Aug. 1998. 40 pages.

(Continued)

*Primary Examiner* — Samson B Lemma
(74) *Attorney, Agent, or Firm* — Foley & Lardner LLP

(57) ABSTRACT

Various embodiments relate to a method performed by a processor of a computing system. An example method includes determining a first cryptographic algorithm utilized in a first block of a first blockchain. The first block of the first blockchain has a first unique block identifier. A second cryptographic algorithm utilized in a second block of the first blockchain is determined. The second block of the first blockchain having a second unique block identifier. A first cryptographic algorithm status transition ("CAST") event is defined if the second cryptographic algorithm is different than the first cryptographic algorithm. A first CAST record is defined upon occurrence of the first CAST event. The first CAST record includes the second cryptographic algorithm and the second unique block identifier. The first CAST record is digitally signed and stored on a second blockchain. The second blockchain may be referenced out-of-band of the first blockchain.

20 Claims, 5 Drawing Sheets

Related U.S. Application Data

(60) Provisional application No. 62/439,620, filed on Dec. 28, 2016.

(51) Int. Cl.
*H04L 9/00* (2022.01)
*H04L 9/14* (2006.01)
*H04L 9/30* (2006.01)

(52) U.S. Cl.
CPC ............ *H04L 9/302* (2013.01); *H04L 9/3239* (2013.01); *H04L 9/3249* (2013.01); *H04L 9/3263* (2013.01); *H04L 2463/121* (2013.01)

(58) Field of Classification Search
CPC ................ H04L 9/0643; H04L 9/3263; H04L 2463/121; H04L 63/12
USPC ......................................................... 713/176
See application file for complete search history.

(56) References Cited

U.S. PATENT DOCUMENTS

| | | | |
|---|---|---|---|
| 2004/0243811 A1* | 12/2004 | Frisch | H04L 9/3247 713/176 |
| 2008/0170686 A1 | 7/2008 | Nemoto et al. | |
| 2009/0291631 A1 | 11/2009 | Xue et al. | |
| 2010/0299315 A1* | 11/2010 | Gosnell | H04L 63/061 707/690 |
| 2012/0179903 A1* | 7/2012 | Arnold | H04L 9/3247 713/155 |
| 2015/0332283 A1* | 11/2015 | Witchey | H04W 12/02 705/3 |
| 2016/0028552 A1* | 1/2016 | Spanos | H04L 9/3236 713/178 |
| 2016/0203496 A1 | 7/2016 | Guerrero et al. | |
| 2017/0109955 A1* | 4/2017 | Ernest | H04L 9/3257 |
| 2017/0206382 A1* | 7/2017 | Rodriguez De Castro | H04L 9/3239 |
| 2017/0236123 A1* | 8/2017 | Ali | G06Q 20/3825 705/75 |
| 2017/0366353 A1* | 12/2017 | Struttmann | G06F 21/64 |
| 2018/0205552 A1* | 7/2018 | Struttmann | H04L 9/3242 |
| 2018/0219669 A1* | 8/2018 | Chen | H04L 9/002 |

OTHER PUBLICATIONS

Cryptographic Message Syntax—ASN.1 and XML, American National Standard for Financial Services, ANSI X9.73-2010, Apr. 15, 2010. 89 pages.

Retail Financial Services—Requirements for Protection of Sensitive Payment Card Data—Part 2: Implementing Post-Authorization Tokenization Systems, American National Standard for Financial Services, ANSI X9.119-2016. 67 pages.

Series X: Data Networks, Open System Communications and Security—OSI networking and system aspects—Naming, Addressing and Registration, International Telecommunication Union, ITU-T X.660, Jul. 2011. 32 pages.

Series X: Data Networks, Open System Communications and Security—OSI networking and system aspects—Abstract Syntax Notation One (ASN.1), International Telecommunication Union, ITU-T X.680, Aug. 2015. 194 pages.

Series X: Data Networks, Open System Communications and Security, International Telecommunication Union, ITU-T X.509, Oct. 2012. 208 Pages.

Trusted Time Stamp Management and Security, American National Standard for Financial Services, ANSI X8.95-2011. 150 pages.

* cited by examiner

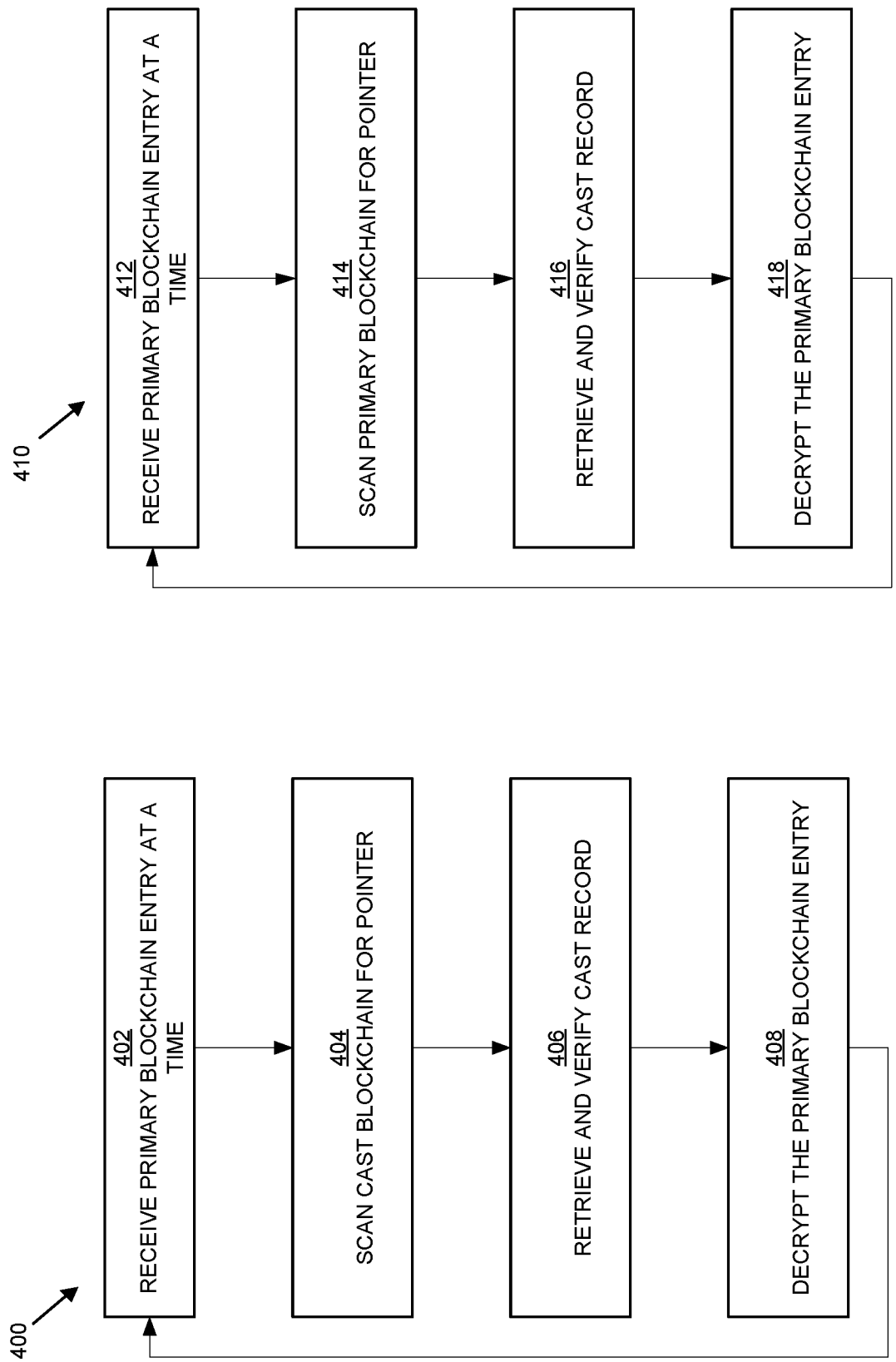

CRYPTOGRAPHIC ALGORITHM STATUS TRANSITION

CROSS-REFERENCE TO RELATED PATENT APPLICATIONS

This application is a continuation of U.S. patent application Ser. No. 15/417,072 entitled "CRYPTOGRAPHIC ALGORITHM STATUS TRANSITION" filed Jan. 26, 2017, which claims priority to U.S. Provisional Patent Application No. 62/439,620 entitled "CRYPTOGRAPHIC ALGORITHM STATUS TRANSITION" filed Dec. 28, 2016 all of which are incorporated herein by reference in their entirety.

BACKGROUND

A blockchain is a distributed database or a distributed ledger whose beneficial attributes include permanency and security. These attributes, however, depend on information security techniques implemented using cryptography. Certain security standards may be used to support these techniques. Blockchain entries consist of blocks of information that can include transactions, transaction record components, transaction entities, and the like. Generally, the blockchain can be used to store, monitor, or document public and sensitive information related to an industry. The blocks may be digitally signed by a blockchain owner, blockchain facilitator, or service provider to ensure their integrity and origin authenticity. In order to allow subscribers to provide and document sensitive information and still provide general access to the blockchain, the sensitive entries may be cryptographically protected. The cryptographic algorithms, parameters, modes of operation, cryptographic keys, and associated cryptographic material used in the blockchain environment can vary over time.

There are many reasons cryptographic algorithms and associated materials may change. For example, the current cryptographic algorithms may come under attack and become compromised or flaws may be discovered. New algorithms may be developed that are stronger or feature superior characteristics of faster processing speed, or more efficient memory and storage requirements over previous versions of cryptography. Additionally, algorithms may need to be replaced due to changes in organizational security policies, government export restrictions, or changes in the legal or regulatory environments in the jurisdictions in which they are deployed. Consequently, for a given block in a blockchain, multiple cryptographic algorithms, varying versions of cryptographic algorithms, and entity-specific cryptography may be active.

Digital signatures are mathematical schemes for demonstrating the authenticity of digital messages or electronic documents. A variety of cryptographic techniques are used to encrypt data and to create digital signatures. With symmetric key cryptographic systems, a pair of users who desire to exchange data securely use a shared "symmetric" key. With this type of approach, a sender of a message uses the same key to encrypt the message that a recipient of the message uses to decrypt the message. Symmetric key systems require that each sender and recipient establish the shared key in a secure manner. Public key systems may also be used to exchange messages securely. With public-key cryptographic systems, two types of keys are used—public keys and private keys. A sender of a message may encrypt the message using the public key of a recipient. The recipient may use a corresponding private key to decrypt the message.

Additionally, public key cryptographic systems (e.g., asymmetric key cryptographic systems) may be used to produce digital signatures. A recipient of a message that has been digitally signed can use the digital signature to verify the identity of the message's sender and to confirm that the message has not been altered during transit. In a typical digital signature arrangement, a sender uses a cryptographic hash function to produce a message digest. The message digest is much smaller than the original message, but is still unique to the message for practical purposes. The sender then uses the sender's private key to sign the message digest. The process of signing the message digest uses a mathematical operation that can only be performed by the sender who possesses the private key. The message and signed message digest (the "digital signature") may then be sent to a recipient. The recipient is an entity that can use the digital signature and the message sender's public key to determine that the sender is the message signer and that the integrity of the message has not been compromised.

SUMMARY

Various embodiments relate to a method performed by a processor of a computing system. An example method includes determining a first cryptographic algorithm utilized in a first block of a first blockchain. The first block of the first blockchain has a first unique block identifier. A second cryptographic algorithm utilized in a second block of the first blockchain is determined. The second block of the first blockchain has a second unique block identifier. A first cryptographic algorithm status transition ("CAST") event is defined if the second cryptographic algorithm is different than the first cryptographic algorithm. A first CAST record is defined upon occurrence of the first CAST event. The first CAST record includes the second cryptographic algorithm and the second unique block identifier. The first CAST record is digitally signed. The first CAST record is stored on a second blockchain. The second blockchain may be referenced out-of-band of the first blockchain to identify a cryptographic algorithm utilized in any of a plurality of blocks of the first blockchain.

Various other embodiments relate to a blockchain system. The blockchain system includes a first blockchain and a second blockchain. The first blockchain includes a plurality of blocks and each of the plurality of blocks are written to the first blockchain by one of a first entity and a second entity. A server system is in operative communication with the blockchain system. The server system includes a processor and instructions stored in non-transitory machine-readable media. The instructions are configured to cause the server system to determine a first entity first cryptographic algorithm utilized by the first entity in the first block of the first blockchain. The first block of the first blockchain has a first unique block identifier. A first entity second cryptographic algorithm utilized by the first entity in a second block of the first blockchain is determined. The second block of the first blockchain has a second unique block identifier. A first CAST event is defined if the first entity second cryptographic algorithm is different than the first entity first cryptographic algorithm. A first CAST record is defined upon occurrence of the first CAST event, the first CAST record including the first entity second cryptographic algorithm and the second unique block identifier. The first CAST record is digitally signed. The first CAST record is stored on the second blockchain. The second blockchain may be referenced out-of-band of the first blockchain to identify a cryptographic algorithm utilized in any of a plurality of blocks of the first blockchain.

Various other embodiments relate to a method performed by a processor of a computing system. The method includes determining a first cryptographic algorithm utilized in a first block of a first blockchain. The first cryptographic algorithm has an associated first cryptographic identifier. The first block of the first blockchain has a first unique block identifier and includes first data. The first data has been processed using the first cryptographic algorithm. A second cryptographic algorithm utilized in a second block of the first blockchain is determined. The second block of the first blockchain has a second unique block identifier. The second cryptographic algorithm has an associated second cryptographic identifier. The second block of the first blockchain includes second data. The second data has been processed using the second cryptographic algorithm. A first CAST event is defined if the second cryptographic algorithm is different than the first cryptographic algorithm. A first CAST record is defined upon occurrence of the first CAST event. The first CAST record includes the first cryptographic algorithm, the associated first cryptographic identifier, the first unique block identifier, the second cryptographic algorithm, the associated second cryptographic identifier, and the second unique block identifier. The first CAST record is digitally signed. The first CAST record is stored on a second blockchain. The second blockchain may be referenced out-of-band of the first blockchain to identify a cryptographic algorithm utilized in any of a plurality of blocks of the first blockchain.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 4A is a flow diagram illustrating a method of identifying a cryptographic algorithm status transition record, according to an example embodiment.

FIG. 4B is a flow diagram illustrating a method of identifying a cryptographic algorithm status transition record, according to an example embodiment.

Figure 1:
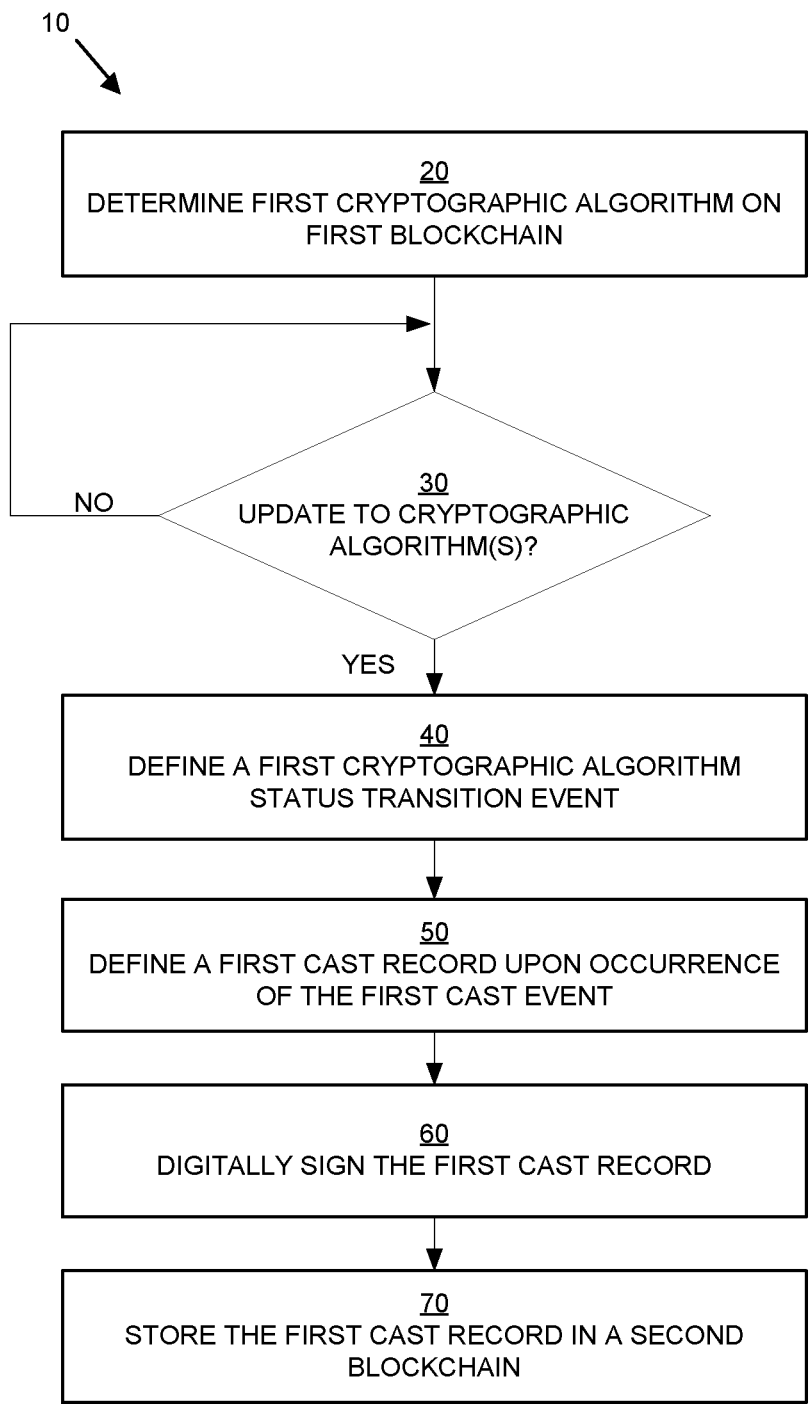
FIG. 1 is a flow diagram illustrating a method of generating a cryptographic algorithm status transition record, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

In order to protect sensitive information on a public or permissioned blockchain, one or more cryptographic algorithms may be utilized throughout the lifetime of the blockchain. There are many reasons cryptographic algorithms and associated materials may change, for example, discovering vulnerabilities, developing superior characteristics, or adapting to new security standards and policies. Changes to the cryptography applied in a given part of the blockchain must be properly identified and managed so that relying parties can continue to be assured of the integrity and authenticity of blockchain information, while not losing the ability to recover encrypted information placed on the blockchain at an earlier time. For example, there may be a change to the key size in the algorithm used on a blockchain data block; however, the output data block may remain the same size. Therefore, without a proper mechanism indicating the key size change in the algorithm, a review of the output data block would not reflect the cryptography change. Consequently, there is a need for a mechanism to monitor and document changes in the cryptography used throughout the lifecycle of a blockchain.

Various embodiments described herein relate to systems and methods for managing a digitally signed set of cryptographic algorithms being used in a blockchain at an arbitrary point in time via a cryptographic algorithm status transition ("CAST") record system. A CAST record provides an indicator of the active cryptographic algorithms (e.g., hash algorithms, digital signatures, RSA modes, initialization factors, tokenization algorithms, key names, etc.) used to protect data objects in a blockchain at a given point in time. A new CAST record indicates a change to one or more of the active cryptographic algorithms. For example, a CAST record may indicate a new version of an existing hash algorithm or an addition of an entity-specific encryption key, among other things. A CAST record is stored out-of-band from the subject blockchain in a data storage location, for example, in a dedicated CAST blockchain.

Generally, a CAST record cryptographically binds cryptographic information under a digital signature to allow for future verification of the authenticity and integrity of the CAST record stored in a CAST blockchain. In some embodiments, the digitally signed object is defined as Abstract Syntax Notation One ("ASN.1") type and the content is signed using an instance of Cryptographic Message Syntax ("CMS") type SignedData, which is defined in the X9.73 financial services security standard. As will be appreciated, a CAST record processing system can be used to synchronize systems (e.g., a data object or similar blockchain) in real time and verify the system holistically and historically.

The CAST record processing system identifies and monitors cryptographic algorithms used in a first blockchain (e.g., primary) blockchain, cryptographically binds the information in a CAST record to provide validity, integrity, and confidentiality of a blockchain structure, and stores the CAST record in a second (e.g., CAST) blockchain. The CAST blockchain is generated and managed by a blockchain facilitator. In some arrangements, the blockchain facilitator is the entity that facilitates the use of the primary blockchain. In some example embodiments, the blockchain facilitator is a service provider, such as a cloud service provider. However, in some embodiments, the blockchain facilitator is a third-party tasked with creating, generating, and facilitating the use of the compliance blockchain system on behalf of the service provider.

The CAST record processing system provides technical solutions to computer-centric and internet-centric problems associated with conventional authentication systems. According to various arrangements, the CAST record processing system, provides a more efficient and effective mechanism to the industry by providing—out-of-band— what cryptography was active at a given time and which cryptographic algorithm was used for each data element. The CAST record processing system is in accordance with industry standards and allows the blockchain facilitator to provide validity, integrity, and confidentiality of a blockchain structure. The CAST record processing system allows for blockchain content to be accessed at a future date, even as algorithms and other cryptographic materials being used in the blockchain change over time. Use of CAST also protects against loss of blockchain subscriber assurance in the data integrity and origin authenticity of blockchain information due to changes in digital signature and cryptographic key management techniques, algorithms, and associated cryptographic materials. Further, digitally signing this information allows for future verification of the integrity and the origin authenticity of the blockchain entry.

By capturing and storing the cryptographic information out-of-band, the CAST record processing system alleviates strain on processing power and memory components currently required to manage, store, and authenticate each blockchain entry. By capturing and storing the state of cryptography for all entities and cryptographic versions on a periodic basis, the CAST record processing system allows for a more efficient cryptography management system without the requirement of processing extra data per each data object on the blockchain (e.g., if each data element had a cryptographic identifier). Additionally, the CAST record processing system allows for seamless transitions in a blockchain system when implementing new cryptographic algorithms in the blockchain system. In this regard, the CAST record processing system provides a more efficient mechanism to manage the risk of loss of access to encrypted data in a perpetual blockchain as encryption algorithms are changed over time.

These problems arise out of the use of computers and the Internet, because the online communications, transactions, and payment services cannot exist without the use of computers and the Internet. Accordingly, problems relating to authenticating content providers and signing party arise out of the use of computers and the Internet. In addition, the inability to properly authenticate a user in an online communication cannot exist outside of computers and the Internet.

Referring to FIG. 1, a flow diagram illustrating a method of generating a CAST record is shown, according to an example embodiment. Generally, the method 10 is used to produce a CAST record signifying a transition in one or more cryptographic algorithms in a first blockchain. The CAST record can be subsequently signed by the blockchain facilitator's private key of a public/private key pair. The generated CAST record cryptographically binds the active cryptography in the primary blockchain at a point in time, along with any additional information that the signing party wants to provide, either under a digital signature or in an extension or similar feature and stored in a CAST record blockchain. As will be appreciated, the method 10 may be performed using an instance of CMS type SignedData.

At 20, the CAST record processing system determines a first cryptographic algorithm active on a primary blockchain. The primary blockchain contains a plurality of data objects or data structures that are cryptographically protected in order to secure the sensitive data. The primary blockchain may include data related to financial institutions, financial instruments, biometric data, or other sensitive data elements. The data elements may be related to one or more entities. For example, the primary blockchain may include financial transactions for a plurality of credit card providers. To protect these data elements the primary blockchain may implement one or more cryptographic algorithms or various versions of the cryptographic algorithm(s). The cryptographic algorithms can include, hash algorithms, digital signatures, modes, initialization factors, tokenization algorithm, key names, and the like. For example, an RSA may presently support RSA SHA-1, and may support RSA signatures with only SHA-256. However, in the future, the RSA may not support RSA at all, but may support elliptic curve signatures with SHA.

At 30, it is determined whether there has been a change to the active cryptographic algorithms in the primary blockchain. This change can include adding a cryptographic algorithm, removing a cryptographic algorithm, altering (e.g., versioning) a cryptographic algorithm, swapping (e.g., using an existing cryptographic algorithm) a cryptographic algorithm, or a similar alteration. If no change has occurred, the CAST record processing system continues to monitor the status of the active cryptographic algorithms in the primary blockchain.

At 40, a first CAST event is defined in response to the change to the active cryptographic algorithms in the primary blockchain identified at 30. In some arrangements, this includes determining the active cryptographic algorithms, the associated entity or data for each active cryptographic algorithm, and other information needed to access any encrypted data element on the primary blockchain at a later point in time.

At 50, the first CAST record associated with the occurrence of the first CAST event is defined. The first CAST record also includes an indicator of the point in the primary blockchain that the CAST record is associated with. For example, the CAST record can include a pointer to the primary blockchain location that the CAST record is capturing. This feature would allow a relying party to review the CAST record and know where on the primary blockchain the cryptographic algorithms in the CAST record were active. In some arrangements, a time stamp token ("TST") may be requested from a time stamp authority ("TSA"). In some arrangements, the TST is requested by generating a hash of the CAST record, which is used as an input to a trusted time stamp process. For example, in one embodiment, the hash is transmitted to a TSA, which cryptographically binds the hash to a time stamp to generate a TST. The TST can be subsequently included in the CAST record under a digital signature, or stored outside of the digital signature. In other arrangements, a non-trusted time stamp (e.g., local to the signcrypting party computing system) may be included.

At 60, the first CAST record is digitally signed. Generally, the digital signature process includes generating a hash of the content-to-be-signed (e.g., the CAST record containing the active cryptographic algorithms in the primary blockchain) using a hash algorithm. The signing party (e.g., the blockchain facilitator) may identify other attributes or parameters to include in the resulting signed CAST record.

The hash of the content-to-be-signed is then signed with the signing party's private key of a public/private key pair. The public/private key pair may be one associated with a public key infrastructure ("PKI"). The resulting signed CAST record binds the content-to-be-signed, thus providing the signing party with a certificate identity parameter (e.g., the public/private key pair) bound to the CAST record. In some arrangements, different versions of the same cryptographic algorithm may be active over the same time period, for example, encryption key A and encryption key B. In those arrangements, an identifier is included in the CAST record to distinguish data elements on the primary blockchain that are encrypted using each version of the cryptographic algorithm. For example, data elements on the primary blockchain encrypted using encryption key A may have a unique one byte identifier appended on the end of the encrypted data element.

In some arrangements, attributes that are protected under the signature on the content-to-be-signed may be included in a component of the digital signature. These signed attributes can serve the same function in an identity management context as "signed claims" or "signed assertions" provided using X.509 Attribute Certificates or XML Security Assertion Markup Language ("SAML") assertions. The X.509 extension mechanism in version 3 allows the X.509 to be extended by anyone with a need without requiring any change whatsoever to the X.509 standard. These "protocol holes" are a free form, open ended location that a user of the protocol can fill in with anything they need or that suits them. Each extension is a package containing an identifier of its content (e.g., the extension payload) and the extension content. The content may be of any type of data and of any kind or format. Additionally, X.509 has two Distinguished Names ("DN") in every certificate, one DN for the certificate subject and another DN for the certificate issuer, implemented as a set of attributes. The X.509 DNs can be cryptographically bound by a digital signature of the certificate issuer.

In other arrangements, the digital signature of a CAST record is in the form used to sign an X.509 certificate. In such arrangements, the certificate is a "sequence" type containing a component that is the content-to-be-signed, the digital signature on the content-to-be-signed component, and information indicating the signing party's public key, the digital signature algorithm used, and additional parameters used to form the CAST record. In other arrangements, the digital signature of a CAST record is in the form used to sign X.509 attributes. The attributes can be used, for example, to identify a particular transaction type or entity, for example, a credit card service provider. In some arrangements, each CAST record could be entity specific, with each CAST record including as an attribute an identifier of the entity it is associated with. For example, CAST records related to a first credit card provider's transitioning cryptographic algorithms may include an attribute that identifies the CAST record as being associated with the first credit card provider. In other arrangements, the attributes are accomplished by using a unique information object identifier ("OM") to indicate the attributes that are expected to be present in the content.

In some arrangements, the digital signature of a CAST record is completed using the Abstract Syntax Notation One ("ASN.1") type "SignedData." In those arrangements, a cryptographic hash is used to create the CAST record on the content-to-be-signed and any associated attributes carried in type SignedData. The hash is calculated using the hash algorithm and parameters specified by the blockchain facilitator, the content-to-be-signed, and any attributes the blockchain facilitator wants to authenticate and cryptographically bind to the content. In some arrangements the TST is not part of the digital signature message. In other arrangements, the TST is included in "attributes" of the SignedData message. For example, both a SAML assertion and the TST could be included in the SignedData UnsignedAttributes field, as well as being cryptographically bound to the content.

In some embodiments, CAST records are structured using a newly-developed data type named CurrentCAST, which is an instance of CMS type SignedData. The schema for CurrentCAST allows the content to be represented in the blockchain in either a compact binary format or as human readable, for example, in XML markup. The CurrentCast includes a pointer or reference to an associated blockchain or database that stores the encryption algorithms used. The digitally signed CurrentCAST of the CAST schema lists all of the cryptography currently in use in the primary blockchain environment until a subsequent CurrentCAST is posted. Following any CurrentCAST and between any two CurrentCAST, relying parties can determine which cryptographic algorithms are in force for the structure and content of those blocks in the chain. An example CurrentCast sequence includes:

CurrentCAST::=SEQUENCE {
   contentEncryption ContentEncryptionAlgorithmIdentifiers,
   digest DigestAlgorithm Identifiers,
   fpe FPEAlgorithmIdentifiers,
   keyDerivation KeyDerivationAlgorithmIdentifiers,
   keyEncryption KeyEncryptionAlgorithm Identifiers,
   keyWrapEncryption KeyWrapEncryptionAlgorithmIdentifiers,
   mac MessageAuthenticationCodeAlgorithmIdentifiers,
   publicKey PublicKeyAlgorithmIdentifiers,
   signature SignatureAlgorithmIdentifiers,
   tokenization TokenizationAlgorithmIdentifiers,
   other OtherTypes OPTIONAL
}

In this implementation of CurrentCast, the CAST record processing system monitors the primary blockchain for changes to content encryption, key generation, key derivation, digest generation, digital signature generation, and content tokenization.". CurrentCAST allows for additional cryptographic changes to be monitored.

Alternatively, any SignedData content-to-be-signed (e.g., CAST record event) can be "detached." The detached content is such that the signature in the SignedData message is performed over the content-to-be-signed, but that signed content is not included in the SignedData message, thereby being detached. However, the content-to-be-signed must be available when the SignedData signature is verified, since the signature verification process requires computing the hash over the content-to-be-signed. This allows an application process to operate on cryptographic algorithm information while ignoring associated information security management attributes, and to rely on another application process (e.g., a Web service to perform signature verification).

Additionally, certificates to support the key management techniques can be included in a CAST record using the typed SignedData. The certificates component of type SignedData is a value of type "Certificates," which may contain a collection of one or more certificates. The certificates used in X9.73 are signed binary objects, whose digital signatures have been calculated over values encoded using the Distinguished Encoding Rules ("DER") of ASN.1 using schema defined for these types in other standards. In order to verify the signatures on these objects, their original encodings must be maintained, but these values must also be represented in XML markup in a useful textual format. Consequently, the values in the certificates component of type Certificates have been Base64-armored to minimize their size when represented using XML markup while preserving their original encodings. The input to the Base64 processing is defined in this Standard as a Basic Encoding Rules ("BER") encoded value of type SET OF CertificateChoices. Any combination of certificates, including X.509 certificates, attribute certificates and certificates supporting XML Advanced Electronic Signatures ("XAdES") may be included in the Certificates type, and they may appear in any order.

At 70, the CAST record is stored in a CAST (e.g., second) blockchain. In some arrangements, included within the CAST record is a pointer to the location on the primary blockchain associated with the CAST record. In other arrangements, the CAST record is stored in the CAST blockchain along with a pointer to the location on the primary blockchain associated with the CAST record. In some arrangements, a pointer to the location of the CAST record on the CAST blockchain is stored in the primary blockchain.

Figure 2:
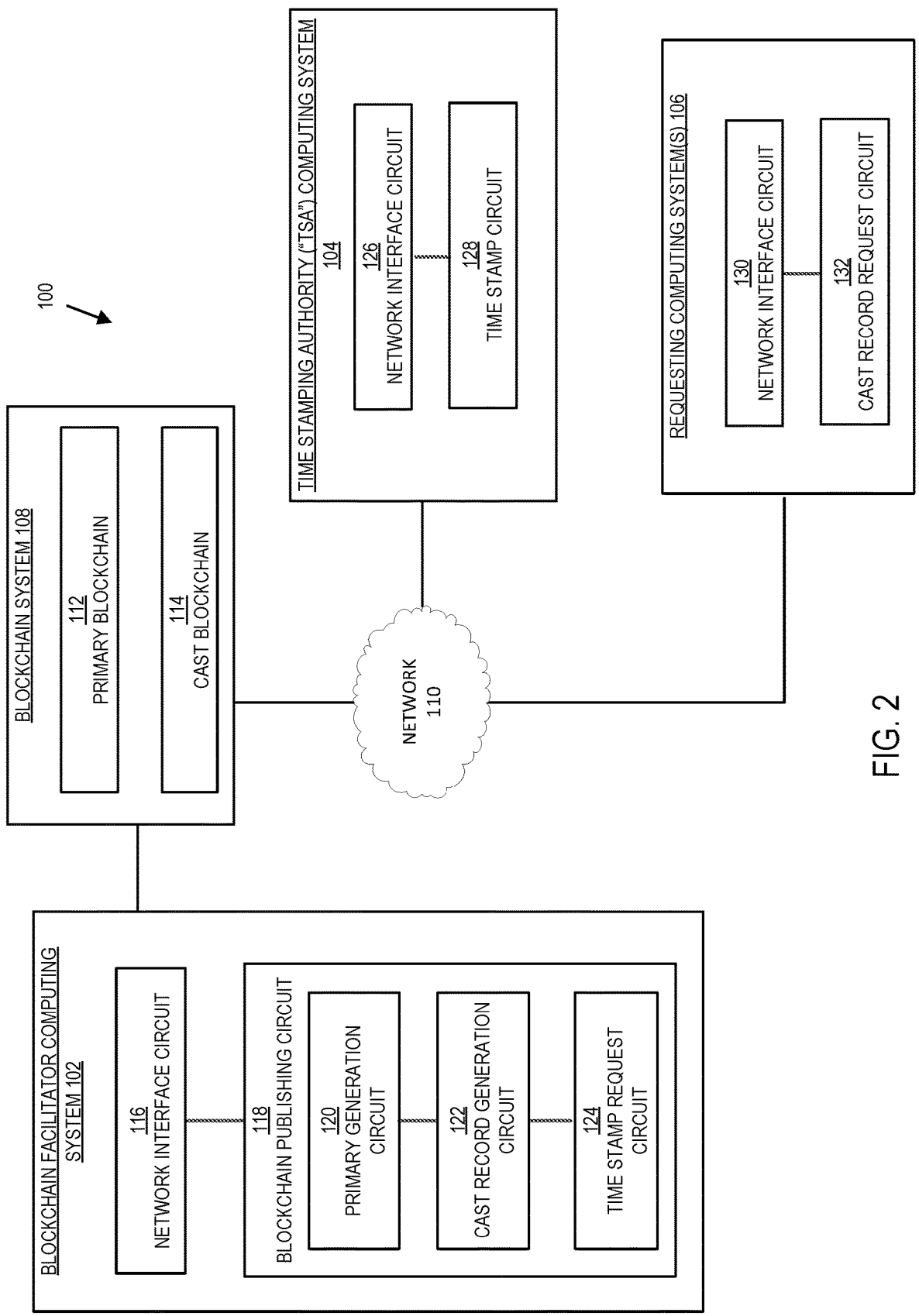
FIG. 2 is a schematic diagram of a cryptographic algorithm transition status record processing system, according to an example embodiment.

FIG. 2 is a schematic diagram of a CAST record processing system 100, according to an example embodiment. The CAST record processing system 100 includes a blockchain facilitator computing system 102, which manages a blockchain system 108, a TSA computing system 104, and a requesting (e.g., compliance entity, entity related to information captured on the primary blockchain, future verifying party, etc.) computing system 106. Each of the blockchain facilitator computing system 102, the blockchain system 108, the TSA computing system 104, and the requesting computing system 106 is in operative communication with the others via a network 110. The network 110 may include, for example, the Internet, cellular networks, proprietary cloud networks, and the like. The CAST record processing system 100 allows for the monitoring and future identification of any cryptographic algorithms active in a primary blockchain at a given point in the life cycle of the primary blockchain. Specifically, the CAST record processing system 100 operates by identifying a cryptographic algorithm transition from the primary blockchain; generating, signing, and storing a CAST record; and subsequently retrieving the proper cryptographic algorithm in use at a point in the primary blockchain.

The blockchain system 108 comprises a primary blockchain 112 and a CAST blockchain 114. The primary blockchain 112 contains a plurality of data objects or data structures that are cryptographically protected in order to secure the sensitive data. Each block in the primary blockchain 112 has a first unique block identifier. The primary blockchain 112 may include data related to financial institutions, financial instruments, biometric data, or other sensitive data elements. The data elements may be related to one or more entities. For example, the primary blockchain 112 may include transaction information for a plurality of financial institutions. To protect these data elements the primary blockchain may implement one or more cryptographic algorithms or various versions of the cryptographic algorithm(s). The cryptographic algorithms can include hash algorithms, digital signatures, modes, initialization factors, tokenization algorithm, key names, and the like. For example, an RSA may presently support RSA SHA-1 and RSA signatures with only SHA-256 in the present. In the future, the RSA may not support RSA at all, but may support elliptic curve signatures with SHA. In some arrangements, the primary blockchain 112 includes one or more pointers to an associated CAST record on the CAST blockchain 114 that signifies a cryptographic algorithm transition at that point in the primary blockchain 112. In such arrangements, an entity may easily determine a cryptographic algorithm transition by searching for these pointers on the primary blockchain 112.

The CAST blockchain 114 includes a plurality of CAST records. The CAST records can be similar to the CAST records generated using the method 10 of FIG. 1. The CAST blockchain 114 can include CAST records that are: (1) holistic to the state of the cryptographic algorithms at a given point in time on the primary blockchain; (2) entity-specific at a given point in time on the primary blockchain; (3) cryptographic algorithm-specific at a given point in time on the primary blockchain; or (4) tailored to the needs of the blockchain facilitator in other ways. In some arrangements, the CAST blockchain 114 includes a pointer (either within the CAST record or stored with the CAST record) to the location on the primary blockchain 112 associated with the information in the CAST record. In these arrangements, the pointer on the CAST blockchain allows the blockchain facilitator computing system 102, or other entity with access to the CAST blockchain 114, to "scan" the CAST blockchain 114 to find a CAST record associated with a block on the primary blockchain 112. As will be appreciated, this allows for efficient and effective retrieval of the active cryptographic algorithms in a block on primary blockchain 112.

The blockchain facilitator computing system 102 includes a network interface circuit 116 and a blockchain publishing circuit 118. The network interface circuit 116 is structured to facilitate operative communication between the blockchain facilitator computing system 102 and other systems and devices over the network 110. The blockchain publishing circuit 118 includes a primary blockchain generation circuit 120, a CAST record generation circuit 122, and a time stamp request circuit 124. The primary blockchain generation circuit 120 is structured to receive data elements, determine what cryptographic algorithms should be used to process and protect the data, determine if a TST needs to be negotiated, and ultimately publish the data to the primary blockchain in the correct format on the primary blockchain 112. The blockchain publishing circuit 118 receives data elements from the blockchain facilitator computing system 102 as they are generated. The blockchain publishing circuit 118 determines which active cryptographic algorithm is to be used to protect the data.

The CAST generation circuit 122 is structured to monitor the cryptographic algorithm status on the primary blockchain 112 and generate CAST records, as necessary. CAST records can be generated using the method 10 of FIG. 1, or in other ways. The CAST generation circuit 122 is structured to generate the pointers (either on the primary blockchain 112 pointing to the associated CAST record, or on the CAST blockchain 114 pointing to the associated block(s) on the primary blockchain 112) for the CAST records. In some arrangements, the CAST generation circuit 122 is also structured to facilitate the retrieval of the associated CAST record for a block and/or data element on the primary blockchain 112.

The time stamp request circuit 124 is structured to negotiate a TST with the TSA computing system 104 for the CAST records or the data elements on the primary blockchain 112. The time stamp request circuit 124 submits a time stamp request including a hash of the information (e.g., the CAST record or the data elements/block on the primary blockchain 112) to the TSA computing system 104. The TSA computing system 104 returns a response containing the TST to the time stamp request circuit 124 of the blockchain facilitator computing system 102, which provides evidence that the digital data existed at the time indicated by the time stamp. The TST received in response to the request contains a hash value (e.g., the hash of the information), the time stamp (e.g., time of generation) and a cryptographic binding (e.g. cryptography).

The TSA computing system 104 includes a network interface circuit 126 and a time stamp circuit 128. The TSA computing system 104 is managed by any trusted time authority that can provide a TST for a piece of information or data entry. The trusted time authority can be one that complies with the X9.95 standard, or those defined in similar standards by ISO/IEC, and satisfies legal and regulatory requirements. In some arrangements, the TSA computing system 106 may be contained in, and controlled by, the blockchain facilitator computing system 102. The network interface circuit 126 is structured to facilitate operative communication between the TSA computing system 104, the blockchain facilitator computing system 102 and the blockchain system 108 over the network 110. The time stamp circuit 128 is structured to negotiate a trusted TST, which includes receiving a hash of a piece of information and generating a trusted TST for the information for future verification. In some arrangements, the TST is stored as an attribute in the CAST record.

The requesting computing system 106 includes a network interface circuit 130 and a request circuit 132. Generally, the requesting computing system 106 is structured to retrieve a CAST record from the CAST blockchain 114 associated with a point on the primary blockchain 112 in order to verify, authenticate, audit, etc., the cryptographic algorithms in that block on the primary blockchain 112. The network interface circuit 130 is structured to facilitate operative communication between the requesting computing system 106 and other systems and devices over the network 110. The process for requesting and validating a CAST record is described in greater detail in methods 400, 410, 420 of FIGS. 4A, 4B, and 4C, respectively.

The request circuit 132 is structured to retrieve a CAST record that identifies the cryptographic algorithms active for a particular block or data element in a block on the primary blockchain 112. In some arrangements, there is an application or web browser on the computing system that facilitates this process. For example, the requesting computing system 106 may identify a block, collection of blocks, an encrypted data element, or collection of encrypted data elements and request for the CAST record(s) associated with the identified information on the primary blockchain 112. In some arrangements, each encrypted data element has a unique CAST record identifier that is associated with a CAST record on the CAST blockchain 114. For example, the information needed for retrieving the CAST record can instead be contained in an attribute of the digital signature message that may be cryptographically bound to the data element in the primary blockchain being signed under the digital signature.

Figure 3:
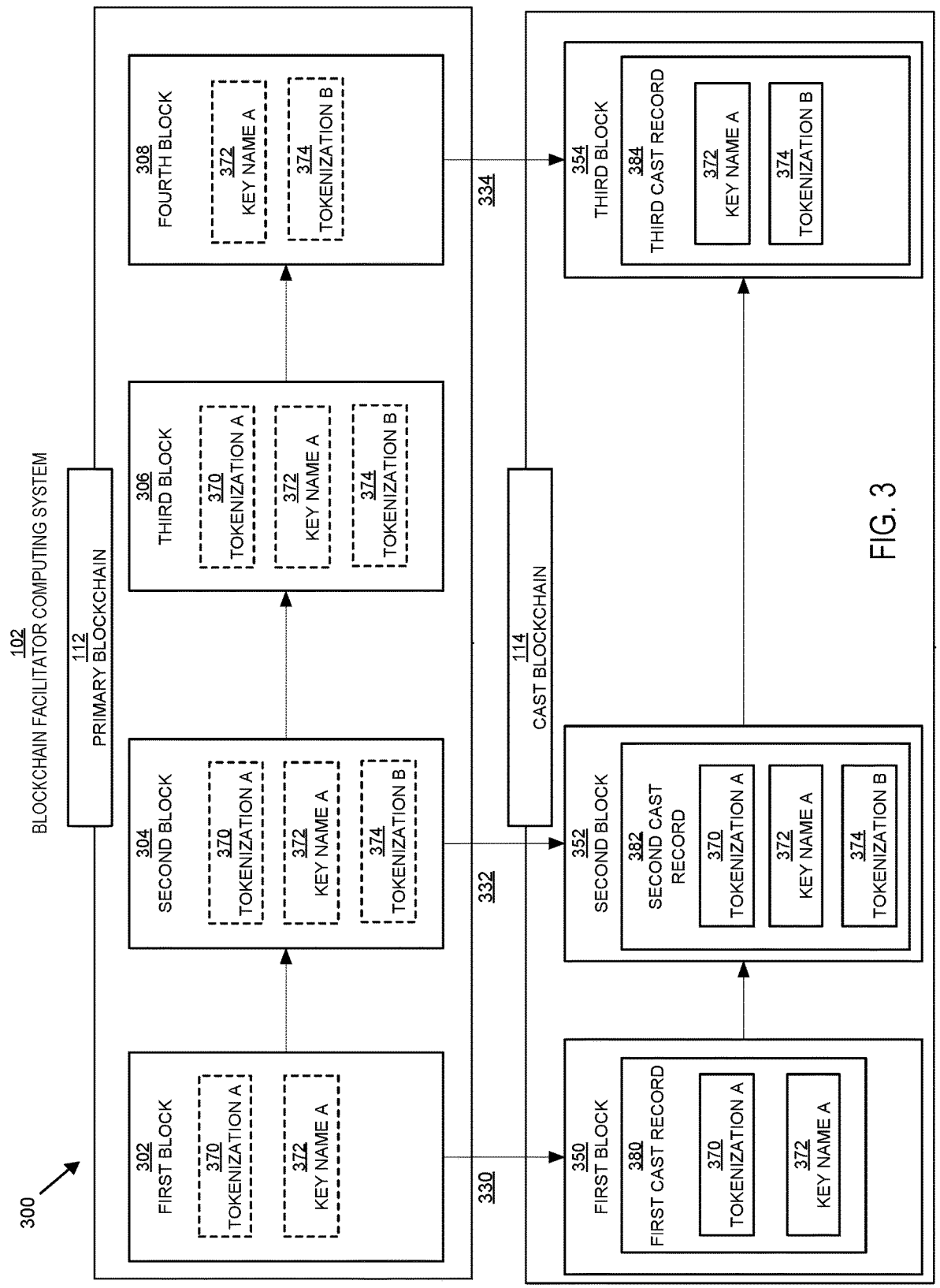
FIG. 3 is a schematic flow diagram illustrating a method of monitoring cryptographic algorithm status transition events, according to an example embodiment.

Referring to FIG. 3, a schematic flow diagram illustrating a method 300 of monitoring cryptographic algorithm status transition events is shown, according to an example embodiment. The method 300 is described in connection with a blockchain facilitator computing system 102 that manages a blockchain system 108 including a primary blockchain 112 and a CAST blockchain 114. The blockchain facilitator computing system 102 and the blockchain system 108 can be the same as the respective elements described in connection with FIG. 2.

The method 300 begins with a first block 302 published on the primary blockchain 112. The first block includes two active cryptographic algorithms, a tokenization schema A 370 and a key name A 372. The tokenization schema A 370 and the key name A 372 are used to encrypt the data elements in the first block 302. In some arrangements, the encrypted data elements include a cryptographic algorithm identifier. In other arrangements, the data structure (e.g., length, type, a strong, etc.) differentiates between the active cryptographic algorithms. In some arrangements, prior to the generation of the first CAST record at 330, an origin CAST record (not shown) is defined. The origin CAST record includes an origin cryptographic algorithm used in the origin block of the primary blockchain 112. The origin CAST record may be digitally signed and stored on the CAST blockchain 114 as the origin block in the CAST blockchain 114.

At 330, the blockchain facilitator computing system 102 determines a first cryptographic algorithm transition event, 330, triggered by the change of the cryptographic algorithms from no cryptographic algorithms—or in some arrangements, from a origin cryptographic algorithm—to a tokenization schema A 370 and a key name A 372. The triggering of a CAST event generates a CAST record. The CAST record can be generated using the method 10 discussed above in FIG. 1, or in other ways.

At 350, a first CAST record block 350 is published on the CAST blockchain 114. The first CAST record block 350 includes the digitally signed first CAST record 380. The digitally signed first CAST record 380 includes the active cryptographic algorithms in the first block 302 of the primary blockchain 112, which include the tokenization schema A 370 and the key name A 372. In some arrangements, a pointer to the location of the active cryptographic algorithms in the first CAST record 380 is stored within the first CAST record 380. In other arrangements, the pointer is stored within the first CAST record block 350 of the CAST blockchain 114.

At 304, a second block 304 is published on the primary blockchain 112. The second block 304 contains a new active cryptographic algorithm, the tokenization schema B 374.

At 332, the blockchain facilitator computing system 102 determines a second cryptographic algorithm transition event, 332, triggered by the change of the cryptographic algorithms in the addition of another tokenization schema.

At 352, a second CAST record block 352 is published on the CAST blockchain 114. The second CAST record block 352 includes the digitally signed second CAST record 382. The digitally signed second CAST record 382 includes the active cryptographic algorithms in the second block 304 of the primary blockchain 112, which include the tokenization schema A 370, tokenization schema B 374, and the key name A 372. In some arrangements, a pointer to the location of the active cryptographic algorithms in the second CAST record 382 is stored within the second CAST record 382. In other arrangements, the pointer is stored within the second CAST record block 352 of the CAST blockchain 114.

At 306, a third block 306 is published on the primary blockchain 112. The third block 306 makes use of the cryptographic algorithms tokenization schema A 370, tokenization schema B 374, and the key name A 372. The blockchain facilitator computing system 102 determines that no cryptographic algorithm transition event has occurred, therefore, no CAST record is generated.

At 308, a fourth block 308 is published on the primary blockchain 112. The fourth block 308 no longer makes use of the cryptographic algorithm tokenization schema A 370, but still uses tokenization schema B 374 and the key name A 372.

At 334, the blockchain facilitator computing system 102 determines a third cryptographic algorithm transition event, 334, triggered by the removal of the cryptographic algorithm tokenization schema A 372.

At 354, a third CAST record block 354 is published on the CAST blockchain 114. The third block CAST record 354 includes the digitally signed third CAST record 384. The digitally signed third CAST record 384 includes the active cryptographic algorithms in the fourth block 308 of the primary blockchain 112 that includes tokenization schema B 374, and the key name A 372. In some arrangements, a pointer to the location of the active cryptographic algorithms in the third CAST record 384 is stored within the third CAST record 384. In other arrangements, the pointer is stored within the third CAST record block 354 of the CAST blockchain 114.

FIG. 4A is a flow diagram illustrating a method 400 of identifying a cryptographic algorithm status transition record, according to an example embodiment. The method 400 may be performed using a blockchain system 108 structure where the CAST blockchain 114 includes pointers to the location on the primary blockchain 112 associated with the CAST record. The method 400 may be completed by the blockchain facilitator computing system 102 or the requesting computing system 106 of FIG. 2. In some arrangements, one or more entities may perform the method 400.

At 402, an entry on the primary blockchain 112 is received. The entry may be in reference to a data element within a block on the primary blockchain 112, or in reference to a block on the primary blockchain 112. In some arrangements, an audit of the information in the primary blockchain 112 is conducted that includes extracting a plurality of data elements along the primary blockchain 112. In those arrangements, one or more CAST records may be needed to properly unencrypt the data elements on the primary blockchain 112 and complete the audit. In other arrangements, multiple versions of a cryptographic algorithm may be concurrently active on the primary blockchain. In those arrangements, a CAST record, the encrypted data element, or both, have a identifier of which version of the cryptographic algorithm was used to encrypt the data.

At 404, the CAST blockchain 114 is scanned to locate the pointer associated with the entry on the primary blockchain 112. As will be appreciated, the CAST blockchain 114 will be shorter in length than the primary blockchain 112, as there will be fewer cryptographic algorithm transitions than there will be data elements published. Accordingly, scanning or identifying the pointer on the CAST blockchain 114 associated with the entry on the primary blockchain 112 will be less processor intensive than scanning the primary blockchain 112.

At 406, the CAST record containing the active cryptographic algorithms in the entry on the primary blockchain 112 is retrieved and the digital signature is verified. To verify, a cryptographic hash of the content (e.g., cryptographic algorithm information in the CAST record) identified in the CAST record and this hash is signed using the signer's (e.g., blockchain facilitators) public key signature algorithm, and any additional parameters. If the signature is valid, the result will be the same as the value carried in the CAST record. In some arrangements, the key pair is associated with a digital certificate in a PKI. In other arrangements, the entity verifying the signature could examine a public key component to verify message integrity but would be unable to get origin authenticity assurance. If the signature fails, the entity can reject authenticity of the CAST record.

In some arrangements, the TST of the CAST record is also verified at 406. This verification includes completing a "hash check" with the information. This process includes generating a hash of the original data, appending the timestamp given by the TSA, and calculating the hash of the result (e.g., the hash of the original data with the appended time stamp). The digital signature of the TSA on the TST is validated by checking that the signed hash provided by the TSA was indeed signed with the TSA private key by digital signature verification. The hash check is compared to the hash inside the signed TSA message to confirm they are equal, proving that the timestamp was issued by the TSA and that the message is unaltered. If not, then either the timestamp was altered or the timestamp was not issued by the TSA.

At 408, the CAST record is verified and the proper cryptographic algorithm in the CAST record is used to decrypt the encrypted entry on the primary blockchain 112.

FIG. 4B is a flow diagram illustrating a method of identifying a cryptographic algorithm status transition record, according to an example embodiment. The method 410 may be performed using a blockchain system 108 structure where the primary blockchain 112 includes pointers to the location on the CAST blockchain 114 associated with the CAST record. The method 410 may be completed by the blockchain facilitator computing system 102 or the requesting computing system 106 of FIG. 2. In some arrangements, one or more entities may perform the method 410.

At 412, an entry on the primary blockchain 112 is received. The entry may be in reference to a data element within a block on the primary blockchain 112, or in reference to a block on the primary blockchain 112. In some arrangements, an audit of the information in the primary blockchain 112 is conducted that includes extracting a plurality of data elements along the primary blockchain 112. In those arrangements, one or more CAST records may be needed to properly unencrypt the data elements on the primary blockchain 112 and complete the audit. In other arrangements, multiple versions of a cryptographic algorithm may be concurrently active on the primary blockchain. In those arrangements, a CAST record, the encrypted data element, or both, have a identifier of which version of the cryptographic algorithm was used to encrypt the data.

At 414, the primary blockchain 112 is scanned to locate the pointer to the associated CAST record on the CAST blockchain 114. As will be appreciated, a pointer is placed on the primary blockchain 112 upon the occurrence of a CAST event and the subsequent generation of a CAST record. In that regard, the pointer acts as a "identifier post" signifying a change in the cryptographic algorithms on the primary blockchain 112. By scanning to the left of any entry on the primary blockchain 112, the first pointer identified will be associated with the CAST record containing the active cryptographic algorithms in the identified entry.

At 416, the CAST record containing the active cryptographic algorithms in the entry on the primary blockchain 112 is retrieved and the digital signature is verified. To verify, a cryptographic hash of the content (e.g., cryptographic algorithm information in the CAST record) identified in the CAST record and this hash is signed using the signer's (e.g., blockchain facilitators) public key signature algorithm, and any additional parameters. If the signature is valid, the result will be the same as the value carried in the CAST record. In some arrangements, the key pair is associated with a digital certificate in a PKI. In other arrangements, the entity verifying the signature could examine a public key component to verify message integrity but would be unable to get origin authenticity assurance. If signature fails, the entity can reject authenticity of the CAST record.

In some arrangements, the TST of the CAST record is also verified at 416. This verification includes completing a "hash check" with the information. This process includes generating a hash of the original data, appending the timestamp given by the TSA, and calculating the hash of the result (e.g., the hash of the original data with the appended time stamp). The digital signature of the TSA on the TST is validated by checking that the signed hash provided by the TSA was indeed signed with the TSA private key by digital signature verification. The hash check is compared to the hash inside the signed TSA message to confirm they are equal, proving that the timestamp was issued by the TSA and that the message is unaltered. If not, then either the timestamp was altered or the timestamp was not issued by the TSA.

At 418, the CAST record is verified and the proper cryptographic algorithm in the CAST record is used to decrypt the encrypted entry on the primary blockchain 112.

Figure 4C:
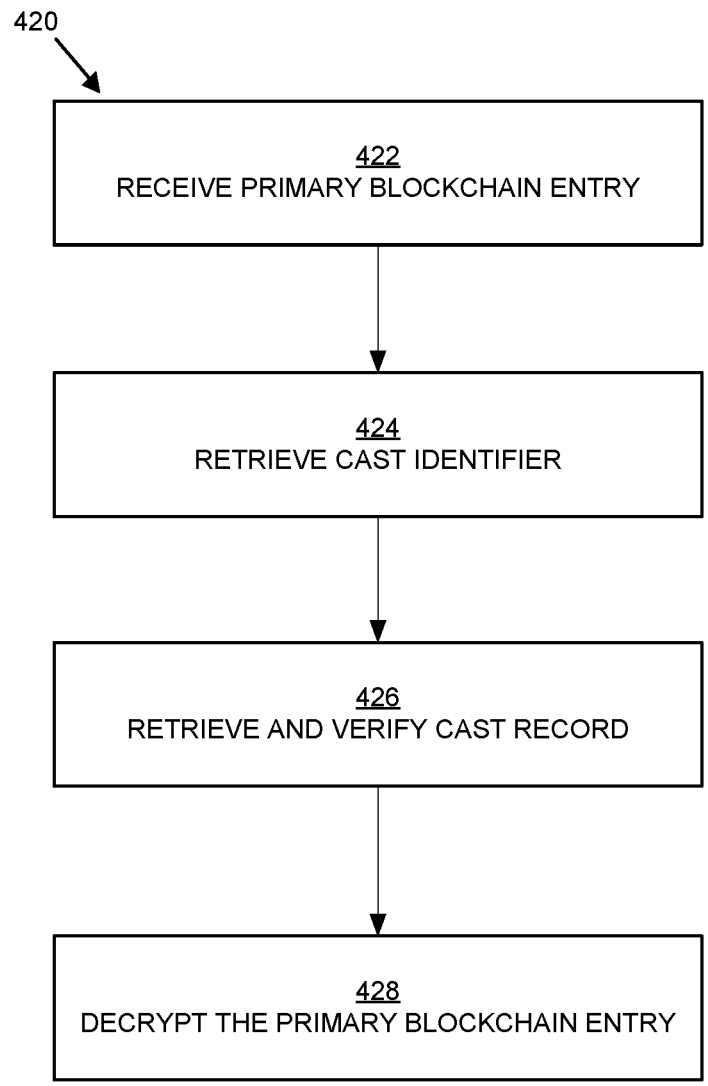
FIG. 4C is a flow diagram illustrating a method of identifying a cryptographic algorithm status transition record, according to an example embodiment.

FIG. 4C is a flow diagram illustrating a method of identifying a cryptographic algorithm status transition record, according to an example embodiment. The method 420 may be performed using a blockchain system 108 structure where the data elements on the primary blockchain 112 include identifiers associated with a CAST record on the CAST blockchain 114. The method 420 may be completed by the blockchain facilitator computing system 102 or the requesting computing system 106 of FIG. 2. In some arrangements, one or more entities may perform the method 420.

At 422, an entry on the primary blockchain 112 is received. The entry may be in reference to a data element within a block on the primary blockchain 112, or in reference to a block on the primary blockchain 112. In some arrangements, an audit of the information in the primary blockchain 112 is conducted that includes extracting a plurality of data elements along the primary blockchain 112. In those arrangements, one or more CAST records may be needed to properly unencrypt the data elements on the primary blockchain 112 and complete the audit. In other arrangements, multiple versions of a cryptographic algorithm may be concurrently active on the primary blockchain. In those arrangements, a CAST record, the encrypted data element, or both, have a identifier of which version of the cryptographic algorithm was used to encrypt the data.

At 424, the CAST identifier is determined from the entry. The CAST identifier acts as marker to the associated CAST record containing the active cryptographic algorithms in the identified entry. As will be appreciated, the CAST identifier for all entries into the primary blockchain 112 will be the same until the occurrence of a CAST event and the subsequent generation of a CAST record. At that point, the entries into the primary blockchain 112 will contain a new CAST identifier.

At 426, the CAST record containing the active cryptographic algorithms in the entry on the primary blockchain 112 is retrieved and the digital signature is verified. To verify, a cryptographic hash of the content (e.g., cryptographic algorithm information in the CAST record) identified in the CAST record and this hash is signed using the signer's (e.g., blockchain facilitators) public key signature algorithm, and any additional parameters. If the signature is valid, the result will be the same as the value carried in the CAST record. In some arrangements, the key pair is associated with a digital certificate in a PKI. In other arrangements, the entity verifying the signature could examine a public key component to verify message integrity but would be unable to get origin authenticity assurance. If signature fails, the entity can reject authenticity of the CAST record.

In some arrangements, the TST of the CAST record is also verified at 406. This verification includes completing a "hash check" with the information. This process includes generating a hash of the original data, appending the timestamp given by the TSA, and calculating the hash of the result (e.g., the hash of the original data with the appended time stamp). The digital signature of the TSA on the TST is validated by checking that the signed hash provided by the TSA was indeed signed with the TSA private key by digital signature verification. The hash check is compared to the hash inside the signed TSA message to confirm they are equal, proving that the timestamp was issued by the TSA and that the message is unaltered. If not, then either the timestamp was altered or the timestamp was not issued by the TSA.

At 428, the CAST record is verified and the proper cryptographic algorithm in the CAST record is used to decrypt the encrypted entry on the primary blockchain 112.

The arrangements described herein have been described with reference to drawings. The drawings illustrate certain details of specific arrangements that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method, the method comprising:
   receiving, by a computing system, encrypted data, the encrypted data stored in a block on a primary blockchain, the primary blockchain implementing a plurality of cryptographic algorithms;
   identifying, by the computing system, a pointer in a plurality of pointers on a cryptographic algorithm status transition ("CAST") blockchain associated with the block comprising the encrypted data, the CAST blockchain comprising a plurality of CAST records, each CAST record comprising a pointer in the plurality of pointers to the primary blockchain, wherein each pointer in the plurality of pointers is associated with a location on the primary blockchain where a change to a cryptographic algorithm in the plurality of cryptographic algorithms occurs;
   verifying, by the computing system, a digital signature of a CAST record based on a cryptographic hash of a content of the CAST record; and
   decrypting, by the computing system, the encrypted data using at least one of the plurality of cryptographic algorithms.

2. The method of claim 1, further comprising:
   retrieving, by the computing system, the CAST record associated with the encrypted data, wherein the verifying comprises:
  identifying, by the computing system, the cryptographic hash of the content of the CAST record; and
  signing, by the computing system, the cryptographic hash using a public key signature algorithm.

3. The method of claim 2, further comprising:
extracting, by the computing system, a plurality of encrypted data elements along the primary blockchain;
retrieving, by the computing system, a second plurality of CAST records, the second plurality of CAST records comprising a second plurality of cryptographic algorithms;
decrypting, by the computing system, the plurality of encrypted data elements using the second plurality of cryptographic algorithms.

4. The method of claim 3, further comprising:
determining, by the computing system, an identifier on the encrypted data elements, the identifier marking which of the plurality of cryptographic algorithms was used to encrypt the encrypted data elements.

5. The method of claim 1, wherein the encrypted data is stored on a second block, further comprising:
  a first cryptographic algorithm utilized in a first block of the primary blockchain, the first block of the primary blockchain having a first unique block identifier;
  a second cryptographic algorithm utilized in the second block of the primary blockchain, the second block of the primary blockchain having a second unique block identifier, the primary blockchain including a plurality of first intermediate blocks between the first and second blocks, the plurality of first intermediate blocks utilizing the first cryptographic algorithm.

6. The method of claim 5, wherein a first CAST event is defined as the second cryptographic algorithm being different than the first cryptographic algorithm, and wherein the CAST record is generated upon an occurrence of the first CAST event.

7. The method of claim 6, wherein the CAST record is digitally signed with a private key to generate a digitally signed first CAST record.

8. The method of claim 7, wherein the CAST record is a first CAST record, and wherein the CAST blockchain further comprises a second CAST record, the second CAST record generated by:
  determining, by the computing system, a third cryptographic algorithm utilized in a third block of the primary blockchain, the third block of the primary blockchain having a third unique block identifier, the primary blockchain including a plurality of second intermediate blocks between the second and third blocks, the plurality of first intermediate blocks utilizing the first cryptographic algorithm;
  defining, by the computing system, a second CAST event if the third cryptographic algorithm is different than the second cryptographic algorithm; and
  generating, by the computing system, the second CAST record upon an occurrence of the second CAST event, the second CAST record including the third cryptographic algorithm and the third unique block identifier.

9. The method of claim 8, further comprising digitally signing, by the computing system, the second CAST record with the private key to generate a digitally signed second CAST record.

10. The method of claim 9, wherein an active cryptographic algorithm in a block in the plurality of first intermediate blocks being determined using the CAST blockchain and each of the digitally signed first CAST record and the second unique block identifier and an active cryptographic algorithm in a block in the plurality of second intermediate blocks can be determined using the CAST blockchain and each of the digitally signed second CAST record and the third unique block identifier.

11. A method of identifying a cryptographic algorithm status transition ("CAST") record, the method comprising:
  receiving, by a computing system, encrypted data, the encrypted data stored in a block on a primary blockchain, the primary blockchain implementing a plurality of cryptographic algorithms;
  identifying, by the computing system, a CAST identifier of the encrypted data, the CAST identifier associated with a CAST record on a CAST blockchain, the CAST blockchain comprising a plurality of CAST records, each CAST record comprising a pointer in a plurality of pointers to the primary blockchain, wherein each pointer in the plurality of pointers is associated with a location on the primary blockchain where a change to a cryptographic algorithm in the plurality of cryptographic algorithms occurs;
  verifying, by the computing system, a digital signature of a CAST record based on a cryptographic hash of a content of the CAST record; and
  decrypting, by the computing system, the encrypted data using at least one of the plurality of cryptographic algorithms.

12. The method of claim 11, further comprising:
retrieving, by the computing system, the CAST record associated with the encrypted data,
wherein the verifying comprises:
  identifying, by the computing system, the cryptographic hash of the content of the CAST record; and
  signing, by the computing system, the cryptographic hash using a public key signature algorithm.

13. The method of claim 12, further comprising:
extracting, by the computing system, a plurality of encrypted data elements along the primary blockchain;
retrieving, by the computing system, a second plurality of CAST records, the second plurality of CAST records comprising a second plurality of cryptographic algorithms;
decrypting, by the computing system, the plurality of encrypted data elements using the second plurality of cryptographic algorithms.

14. The method of claim 13, further comprising:
determining, by the computing system, an identifier on the encrypted data elements, the identifier marking which of the plurality of cryptographic algorithms was used to encrypt the encrypted data elements.

15. The method of claim 11, wherein the encrypted data is stored on a second block, further comprising:
  a first cryptographic algorithm utilized in a first block of the primary blockchain, the first block of the primary blockchain having a first unique block identifier;
  a second cryptographic algorithm utilized in the second block of the primary blockchain, the second block of the primary blockchain having a second unique block identifier, the primary blockchain including a plurality of first intermediate blocks between the first and second blocks, the plurality of first intermediate blocks utilizing the first cryptographic algorithm.

16. The method of claim 15, wherein a first CAST event is defined as the second cryptographic algorithm being different than the first cryptographic algorithm, and wherein the CAST record is generated upon an occurrence of the first CAST event.

17. The method of claim 16, wherein the CAST record is digitally signed with a private key to generate a digitally signed first CAST record.

18. The method of claim 17, wherein the CAST record is a first CAST record, and wherein the CAST blockchain further comprises a second CAST record, the second CAST record generated by:
- determining, by the computing system, a third cryptographic algorithm utilized in a third block of the primary blockchain, the third block of the primary blockchain having a third unique block identifier, the primary blockchain including a plurality of second intermediate blocks between the second and third blocks, the plurality of first intermediate blocks utilizing the first cryptographic algorithm;
- defining, by the computing system, a second CAST event if the third cryptographic algorithm is different than the second cryptographic algorithm; and
- generating, by the computing system, the second CAST record upon an occurrence of the second CAST event, the second CAST record including the third cryptographic algorithm and the third unique block identifier.

19. The method of claim 18, further comprising digitally signing, by the computing system, the second CAST record with the private key to generate a digitally signed second CAST record.

20. The method of claim 19, wherein an active cryptographic algorithm in a block in the plurality of first intermediate blocks being determined using the CAST blockchain and each of the digitally signed first CAST record and the second unique block identifier and an active cryptographic algorithm in a block in the plurality of second intermediate blocks can be determined using the CAST blockchain and each of the digitally signed second CAST record and the third unique block identifier.

* * * * *